(12) United States Patent
Hosseini Rankouhi et al.

(10) Patent No.: US 11,701,832 B2
(45) Date of Patent: Jul. 18, 2023

(54) SYSTEMS AND METHODS FOR CONTROLLING ADDITIVE MANUFACTURING SYSTEMS

(71) Applicant: WISCONSIN ALUMNI RESEARCH FOUNDATION, Madison, WI (US)

(72) Inventors: Seyyed Behzad Hosseini Rankouhi, Madison, WI (US); Salman Jahani, Madison, WI (US); Dan Thoma, Fitchburg, WI (US); Frank Pfefferkorn, Madison, WI (US)

(73) Assignee: WISCONSIN ALUMNI RESEARCH FOUNDATION, Madison, WI (US)

( * ) Notice: Subject to any disclaimer, the term of this patent is extended or adjusted under 35 U.S.C. 154(b) by 480 days.

(21) Appl. No.: 16/802,303

(22) Filed: Feb. 26, 2020

(65) Prior Publication Data
US 2021/0260829 A1    Aug. 26, 2021

(51) Int. Cl.
*B29C 64/393*    (2017.01)
*B29C 64/268*    (2017.01)
*B33Y 50/02*    (2015.01)

(52) U.S. Cl.
CPC .......... *B29C 64/393* (2017.08); *B29C 64/268* (2017.08); *B29K 2995/0063* (2013.01); *B29K 2995/0072* (2013.01); *B33Y 50/02* (2014.12)

(58) Field of Classification Search
CPC ................ B29C 64/393; B29C 64/268; B29K 2995/0063; B29K 2995/0072;
(Continued)

(56) References Cited

U.S. PATENT DOCUMENTS

| 10,234,848 B2 | 3/2019 | Mehr et al. |
| 2012/0053716 A1 | 3/2012 | Bickel et al. |

(Continued)

FOREIGN PATENT DOCUMENTS

| CN | 1411942 A | * | 4/2003 |
| CN | 107695346 A | * | 2/2018 |

(Continued)

OTHER PUBLICATIONS

Chao Wei et.al., "Additive manufacturing of horizontal and 3D Functionally Graded 316L—Cu10Sn via Multiple Material", Journal of Manufacturing Science and Engineering, Aug. 2019, vol. 141 (Year: 2019).*

(Continued)

*Primary Examiner* — Thomas C Lee
*Assistant Examiner* — Michael Tang
(74) *Attorney, Agent, or Firm* — Seager, Tufte & Wickhem LLP

(57) ABSTRACT

A system and method for controlling an additive manufacturing system to form a multi-material component. Operating parameter values may be determined for the additive manufacturing system based on a first material and a second material used to form the multi-material component to ensure a requisite level of bonding between particles of a gradient between the first and second materials. Data or models for the first and second materials, along with observed data from a plurality of sample multi-material components formed from the first and second materials may be utilized to determine the operating parameter values. In some cases, the operating parameter values may be tuned to form a multi-material component having predetermined values for parameter objectives along the gradient of the multi-material component. The additive manufacturing system may be a selective laser melting system.

17 Claims, 9 Drawing Sheets

(58) Field of Classification Search
CPC ...... B33Y 50/02; B22F 2999/00; B22F 10/36; B22F 10/38; B22F 10/85; B22F 12/58; B22F 10/28; Y02P 10/25; Y02P 80/40; G05B 2219/49026; G05B 19/4099; G05B 2219/49036
USPC .......................................................... 700/98
See application file for complete search history.

(56) References Cited

U.S. PATENT DOCUMENTS

| | | | | |
|---|---|---|---|---|
| 2017/0067154 | A1* | 3/2017 | Grotjohn | B29C 64/393 |
| 2017/0203408 | A1* | 7/2017 | Ganapathiappan | B24B 37/24 |
| 2018/0093418 | A1 | 4/2018 | Lappas et al. | |
| 2020/0230744 | A1* | 7/2020 | Fried | B33Y 70/00 |
| 2021/0122114 | A1* | 4/2021 | Li | B22F 10/28 |

FOREIGN PATENT DOCUMENTS

| | | | | |
|---|---|---|---|---|
| CN | 110238404 A | * | 9/2019 | |
| CN | 110238404 A | | 9/2019 | |
| CN | 110548874 A | | 12/2019 | |
| CN | 111112619 A | * | 5/2020 | B22F 1/0003 |
| DE | 102018202723 A1 | * | 8/2019 | B22F 3/1055 |
| WO | 2016196382 A1 | | 12/2016 | |
| WO | 2019180466 A1 | | 9/2019 | |
| WO | WO-2019180466 A1 | * | 9/2019 | B29C 64/386 |

OTHER PUBLICATIONS

International Search Report and Written Opinion dated May 28, 2021 for International Application No. PCT/US2021/019207.
J.L. Tan, C.H. Wong and A. Sorkin. "Multi-material modelling for selective laser melting." Procedia Engineering 216 (2017) 51-57. www.sciencedirect.com.
Cher Fu Tey et al. "Additive manufacturing of multiple materials by selective laser melting: Tialloy to stainless steel via a Cu-alloy interlayer." (2020) https://doi.org/10.1016/j.addma.2019.100970.
Ver Hoef, J.M., and Barry, R.P. (1998),"Constructing and Fitting Models for Cokriging and Multivariable Spatial Prediction," Journal of Statistical Planning and Inference, 69, 275-294.
Higdon, D. (2002), "Space and Space-Time Modeling Using Process Convolutions," in Quantitative Methods for Current Environmental Issues, eds. C. W. Anderson, V.Barnett, P.C.Chatwin, and A.H.El-Shaarawi, London,UK: Springer-Verlag,pp. 37-56.
Paciorek, C., and Schervish, M. (2004), "Nonstationary Covariance Functions for Gaussian Process Regression," in Advances in Neural Information Processing Systems (vol. 16),pp. 273-280.
International Search Report and Written Opinion dated May 28, 2021 for International Application No. PCT/US2021/019204.
Rankouhi, "Compositional Grading of a 316-LCu Multi-Material Part using Machine Learning of Selective Laser Melting Process Parameters," Additive Manufacturing, vol. 38,17 pages, 2021.
Rankouhi et al., "Compositional Grading of a 316L-Cu Multi-Material Part using Machine Learning of Selective Laser Melting Process Parameters," Additive Manufacturing, vol. 38, 17 pages, 2021.
Wohlers; Wohlers Report 2019: "3D Printing and Additive Manufacturing State of the Industry," Wohlers Associates, 2019.
Jiang et al; "Predicting the Future of Additive Manufacturing: A Delphi Study on Economic and Societel Implications of 3D Printing for 2030," Technological Forecasting & Social Change, vol. 117, pp. 84-97, 2017.
Bandyopadhyay et al; "Additive Manufacturing of Multi-Material Structures," Materials Science and Engineering: R: Reports, vol. 129, pp. 1-16, Jul. 2018.
Zhang et al; "Additive Manufacturing of Functionally Graded Materials:A Review," Materials Science and Engineering, vol. 764, Sep. 9, 2019.
Loh et al; "An Overview of Functionally Graded Additive Manufacturing," Additive Manufacturing, vol. 23, pp. 34-44, Oct. 2018.
Moltich-Hou, "Aerosint Achieves Multi-Metal Powder Bed Fusion," 3D Print.com, Mar. 9, 2020. Accessed Aug. 31, 2022.
Mirzendehdel et al; "A Pareto-Optimal Approach to Multi-Material Topology Optimization," Journal of Mechanical Design, vol. 137, pp. 1-14, 2015.
Li et al; "Multi-Material Topology Optimization for Practical Lightweight Design," Structural and Multidisciplinary Optimization, vol. 58, Issue 3, pp. 1081-1094, Sep. 2018.
Reichardt et al; "Advances in Additive Manufacturing of Metal-Based Functionally Graded Materials," International Materials Review, vol. 66, Issue 1, pp. 1-29, 2020.
Matsuaka et al; "Micro-feeding of Fine Powders using a Capillary Tube with Ultrasonic Vibration," Advanced Powder Technology, vol. 6, Issue 4, pp. 283-293, 1995.
Pegna et al; "The Sand Painter: Two-Dimensional Powder Deposition," in Solid Free. Fabr. Symp; pp. 695-709, 1999. Accessed Aug. 31, 2022.
Stichel et al; Powder Layer Preparation using Vibration-Controlled Capillary Steel Nozzles for Additive Manufacturing, Physics Procedia, vol. 56, pp. 157-166, 2014.
Chianrabutra et al; "A Dry Powder Material Delivery Device for Multiple Material Additive Manufacturing," in: Solid Free Fabr. Symp; 2014.
Wu et al; "A Vibration-Assisted Powder Delivery System for Additive Manufacturing—An Experimental Investigation," vol. 34, Aug. 2020.
Ott et al; "Multi-Material Processing in Additive Manufacturing," pp. 199-203, 2010. Accessed Sep. 1, 2022.
Chivel, "New Approach to Multi-Material Processing in Selective Laser Melting," Physics Procedia, vol. 83, pp. 891-898, 2016 Accessed Sep. 1, 2022.
Wei et al; "3D Printing of Multiple Metallic Materials via Modified Selective Laser Melting," CIRP Annals—Manufacturing Technology, vol. 67, pp. 245-248, 2018.
Wei et al; "Additive Manufacturing of Horizontal and 3D Functionality Graded 316L/Cu10Sn Components via Multiple Material Selective Laser Melting," Journal of Manufacturing Science and Engineering, Trans. ASCME vol. 141, 2019. a.
Zhang et al; "Additive Manufacturing of Three-Dimensional Metal-Glass Funtionally Gradient Material Components by Laser Powder Bed Fusion with In Situ Powder Mixing," Additive Manufacturing, vol. 33, pp. 1-11, 2020.
Scaramuccia et al; "Development of Processing Strategies for Multigraded Selective Laser Melting of Ti6Al4V and IN718," Powder Technology, vol. 367, pp. 376-389, May 2020.
Tan et al; "Interfacial Characteristic and Mechanical Performance of Maraging Steel-Copper Functional Bimetal Produced by Selective Laser Melting based Hybrid Manufacture," vol. 55, pp. 77-85, Oct. 5, 2018.
Chen et al; "Influence Mechanism of Process Parameters on the Interfacial Characterization of Selective Laser Melting 316L/CuSn10," Material science Engineering, A vol. 792, 2020.
Bai et al; "Dual Interfacial Characterization and Property in Muti-Material Selective Laser Melting of 316L Stainless Steel and C52400 Copper Alloy," Material Characteristics, vol. 167, 2020.
Liu et al; "Interfacial Characterization of SLM Parts in Multi-Material Processing: Metallurgical Diffusion between 316L Stainless Steel and C18400 Copper Alloy," Material Characteristics, vol. 94, pp. 116-125, 2014.
Sing et al; "Interfacial Characterization of SLM Parts in Multi-Material Processing: Intermetallic Phase Formation between AlSi10Mg and C18400 Copper Alloy," Material Characteristics, vol. 107, pp. 220-227.
King et al; "Laser Powder Bed Fusion Additive Manufacturing of Metals, Physics, Computational, and Materials Challenges," Applied Physics, Rev. 2, 2015.
King et al; "Overview of Modelling and Simulation of Metal Powder Bed Fusion Process at Lawrence Livermore National Laboratory," Taylor & Francis, 2015.

(56) References Cited

OTHER PUBLICATIONS

Khairallah et al; "Laser Powder-Bed Fusion Additive Manufacturing: Physics of Complex Melt Flow and Formation Mechanisms of Pores, Spatter, and Denudation Zones," Acta. Mater. vol. 108, pp. 36-45, 2016.
Wei et al; "Mechanistic Models for Additive Manufacturing of Metallic Components," Prog. Mater. Sci., 2020.
Yan et al; "Data-Driven Multiscale Multi-Physics Models to Derive Process-Structure-Property Relationships for Additive Manufacturing," Comput. Mech. vol. 61, pp. 521-541, 2018.
Tang et al; "Prediction of Lack-of-Fusion Porosity for Powder Bed Fusion," Addit. Manuf. vol. 14, pp. 39-48, 2017.
Cunningham et al; "Keyhole Threshold and Morphology in Laser Melting Revealed by Ultrahigh-Speed X-Ray Imaging," Science,, vol. 363, pp. 849-852, 2019.
Clymer et al; "Power-Velocity Process Design Charts for Powder Bed Additive Manufacturing," in J. Mech. Des. Trans. ASCME, vol. 139, 2017.
Bertoli et al; "On the Limitations of Volumetric Energy Density as a Design Parameter for Selective Laser Melting," Mater. Des. vol. 113, pp. 331-340, 2017.
Imani et al; Process Mapping and In-Process Monitoring of Porosity in Laser Powder Bed Fusion using Layerwise Optical Imaging, in: J. Manuf. Sci. Eng. Trans. ASME, vol. 140, 2018.
Agrawal et al; "High-Throughput Experimentation for Microstructural Design in Additively Manufactured 316L Stainless Steel," Mater. Sci. Eng. A vol. 793, 2020.
Hattrick-Simpers, "Perspective Composition Structure-Property Mapping in High-Throughput Experiments: Turning Data into Knowledge," APL Mater., vol. 4, 2016.
Xiang et al; "A Combinatorial Approach to Materials Discovery," Science, vol. 268, pp. 1738-1740, 1995.
Jadeleit et al; "Combinatorial Materials Science and Catalysis," Angew. Chem. Int. Ed. vol. 38, vol. 38, pp. 2494-2532, 1999.
Maier et al; "Combinatorial and High-Throughput Materials Science," Angew. Chem. Int. Ed. vol. 46, pp. 6016-6067, 2007.
Green et al; "Applications of High Throughput (Combinatorial) Methodologies to Electronic, Magnetic, Optical and Energy-Related Materials," J. Appl. Phys. vol. 113, 2013.
Cawse, "Experimental Design for Combinatorial and High Throughput Materials Development," GE Global Research, 2002.
About the Materials Genome Initiative The White House, n.d.(https://obamawhitehouse.archives.gov/mgi) (Accessed Sep. 12, 2020).
Green et al; "Fulfilling the Promise of the Materials Genome in Initiative with High Throughput Experimental Methodologies," Appl. Phys. Rev. 4, 2017.
Zhao, "High-Throughput Experimental Tools for the Materials Genome Initiative," Chin. Sci. Bull. vol. 59, pp. 1652-1661, 2014.
Jain et al; "Commentary: The Materials Project: A Materials Genome Approach to Accelerating Materials Innovation," APL Mater. 1, 2013.
Liu et al; A Predictive Machine Learning Approach for Microstructure Optimization and Materials Design, Sci. Rep. 5, pp. 1-12, 2015.
Ren et al; "Accelerated Discovery of Metallic Glasses Through Iteration of Machine Learning and High-Throughput Experiments," Sci. Adv. 4 (2018).
Ramprasad et al; "Machine Learning in Materials Informatics: Recent Applications and Prospects," npj Comput. Mater. vol. 3, p. 54, 2017.
Razvi et al; "A Review of Machine Learning Applications in Additive Manufacturing," in: Proc. ASME Des. Eng. Tech. Conf. American Society of Mechanical Engineers (ASME), 2019.
Silbernagel et al; "Using Machine Learning to Aid in the Parameter Optimisation Process for Metal-Based Additive Manufacturing," Rapid Prootyp. J. 26. pp. 625-637, 2019.
Mozaffar et al; "Data-Driven Prediction of the High-Dimensional Thermal History in Directed Energy Deposition via Recurrent Neural Networks," Manuf. Lett. vol. 18, pp. 35-39, 2018.
Scime et al; "Layer-Wise Anamoly Detection and Classification for Powder Bed Additive Manufacturing Processes: a Machine-agnostic Allgorithm for Real-Time Pixel-Wise Semantic Segmentation," Addit. Manuf. vol. 36, 2020.
Goh et al; "A Review on Machine Learning in 3D Printing: Applications, Potential, and Challenges," Artif. Intell. Rev. pp. 1-32, 2020.
Meng et al; "Machine Learning in Additive Manufacturing: A Review," JOM vol. 72, pp. 2363-2377, 2020.
Fathi et al; "Vector Optimization of Laser Solid Freeform Fabrication System using a Hierarchial Mutable Smart Bee-Fuzzy Inference System and Hybrid NGSA-II//Self-organizing Map," J. Intell. Manuf. vol. 25, pp. 775-795, 2014.
Yang et al; "Dynamic Metamodeling for Predictive Analytics in Advanced Manufacturing," Smart Sustain. Manuf. Syst. vol. 2, pp. 18-39, 2018.
Kappes et al; Machine Learning to Optimize Additive Manufacturing Parameters for Laser Powder bed Fusion of Inconel, in Miner. Met. Mater. Ser; Springer International Publishing, pp. 595-627, 2018.
Garg et al; "An Ensemble Approach of Machine Learning in Evaluation of Mechanical Property of the Rapid Prototyping Fabricated Prototype," Appl. Mech, pp. 493-496, 2014.
Yang et al; "A Super-Metamodeling Framework to Optimize System Predictiability," ASME Int., 2018.
Aoyagi et al; "Simple Method to Construct Process Maps for Additive Manufacturing Using a Support Vector Machine," Addit. Manuf. vol. 27, pp. 353-362, 2019.
Tapia et al; "Prediction of Porosity in Metal-Based Additive Manufacturing using Spatial Gaussian Process Models," Addit. Manuf., vol. 12, pp. 282-290, 2016.
Tapia et al; "Gaussian Process-Based Surrogate Modeling Framework for Process Planning in Laser Powder-Bed Fusion Additive Manufacturing of 316L Stainless Steel," Int. J. Adv. Manuf. Technol. vol. 94, pp. 3591-3603, 2018.
Meng et al; "Process Design of Laser Powder Bed Fusion of Stainless Steel using a Gaussian Process-Based Machine Learning Model," JOM, vol. 72, pp. 420-428, 2020.
Rasmussen, "Gaussian Processes in Machine Learning," in Lect. Notes Comput. Sci. (Including Subser. Lect. Notes Artif. Intell. Lect Notes Bioinformatics), vol. 3176, pp. 63-71, 2004.
Spierings et al; "Influence of the Particle Size Distribution on Surface Quality and Mechanical Properties in AM Steel Parts," Rapid Prototyp. J. vol. 17, pp. 195-202, 2011.
Tan et al; "An Overview of Powder Granulometry on Feedstock and Part Performance in the Selective Laser Melting Process," Addit. Manuf. vol. 18, pp. 228-255, 2017.
ASTM F1877-16, "Standard Practice for Characterization of Particles," West Conhoshocken, PA 2016.
Weinekotter et al; "Mixing of Solids," Kluwer Publishers, 2000.
Yasa et al; "Investigation on Occurrance of Elevated Edges in Selective Laser Melting," in Solid Free. Fabr. Symp; Austin, TX pp. 180-192, 2009.
Yadrositev et al; "Surface Morphology in Selective Laser Melting of Metal Powders," Phys. Procedia, pp. 264-270, 2011.
Spierings et al; "Comparison of Density Measurement Techniques for Additive Manufactured Metallic Parts," Rapid Prototyp. J. pp. 380-386, 2011.
ISO 25178-22012(en), Geometrical Product Specifications (GPS)—Surface Texture: Areal—Part 2: Terms, Definitions and Surface Texture Parameters, 2012.
Liverani et al; "Effect of Selective Laser Melting (SLM) Process Parameters on Microstructure and Mechanical Properties of 316L Austentic Stainless Steel," J Mater Process. Technol. vol. 249, pp. 255-263, 2017.
Jadhav et al; "Influence of Selective Laser Melting Process Parameters on Texture Evolution in Pure Copper," J. Mater. Process. Tecnol. vol. 270, pp. 47-58, 2019.
Colopi et al; Selective Laser Melting of Pure Cu with a 1 kW Single Mode Fiber Laser, Procedia CIRP, pp. 59-63, 2018.
Tran et al; "3D Printing of Highly Pure Copper," Metals, vol. 9, p. 756, 2019.
Strano et al; Surface Roughness Analysis, Modelling and Prediction in Selective Laser Melting, J. Mater. Process. Technol, vol. 213, pp. 589-597, 2013.

(56) References Cited

OTHER PUBLICATIONS

Yan et al; "Microstructure and Mechanical Properties of Pure Copper Manufactured by Selective Laser Melting," J. Mater. Sci. Eng. A vol. 789, 2020.

Li et al; "Balling Behavior of Stainless steel and Nickel Powder during Selective Laser Melting Process," Int. J. Adv. Manuf. Technol. vol. 59, pp. 1025-1035, 2012.

Gu et al; "Balling Phenomena in Direct Laser Sintering of Stainless Steel Powder; Metallurgical Mechanisms and Control Methods," Mater. des. vol. 30, pp. 2903-2910, 2009.

Scime et al; "Anomaly Detection and Classification in a Laser Powder Bed Additive Manufacturing Process using a Trained Computer Vision Algorithm," Addit. Manuf. vol. 19, pp. 114-126, 2018.

Aerosint-Selective Powder Deposition for AM, n.d.

* cited by examiner

| Material | Power (W) | Velocity (mm/sec) | Hatch (mm) |
|---|---|---|---|
| 100% SS 316L | 195 | 1700 | 0.07 |
| 75% SS 316L 25% CU | 120 | 800 | 0.11 |
| 50% SS 316L 50% CU | 195 | 940 | 0.09 |
| 25% SS 316L 75% CU | 195 | 1083 | 0.07 |
| 100% Cu | 370 | 400 | 0.07 |

FIG. 8

SYSTEMS AND METHODS FOR CONTROLLING ADDITIVE MANUFACTURING SYSTEMS

TECHNICAL FIELD

The present disclosure pertains to additive manufacturing systems, and the like. More particularly, the present disclosure pertains to controlling operations of additive manufacturing systems to form multi-material components.

BACKGROUND

Additive manufacturing (e.g., metal additive manufacturing (MAM), etc.) has been used in industries to facilitate fabrication of designs that are difficult or not possible to form using conventional techniques. Typically additive manufacturing techniques allow for the fabrication of designs layer-by-layer, without the use of molds or dies. Of the known approaches and systems for additive manufacturing, each has certain advantages and disadvantages.

SUMMARY

This disclosure is directed to several alternative designs for, devices of, and methods of additive manufacturing systems. Although it is noted that additive manufacturing approaches and systems are known, there exists a need for improvement to those approaches and systems.

Accordingly, one illustrative instance of the disclosure may include a method of controlling an additive manufacturing system to form a multi-material component. The method may include identifying a model of a first material, the model of the first material may be configured to output parameter values of the additive manufacturing system based on one or more parameter objectives for a component formed with the first material; identifying a model of a second material, the model of the second material may be configured to output parameter values of the additive manufacturing system based on one or more parameter objectives for a component formed with the second material; identifying observed data from a plurality of samples having a gradient of the first material and the second material, wherein for each sample of the plurality of samples, the observed data may include a set of parameter values used by the additive manufacturing system to form the sample and an associated measured value for each of one or more parameter objectives for the multi-material component; and establishing operating parameter values for the additive manufacturing system to form, at least in part, the multi-material component using the first material and the second material based on the model of the first material, the model of the second material, and the observed data. The operating parameter values may be configured to result in the multi-material component having predetermined values of at least one of the one or more parameter objectives for the multi-material component.

Additionally or alternatively to any of the embodiments above, the method may further include identifying a model of multi-material components having the gradient of the first material and the second material for determining operating parameter values of the additive manufacturing system based on the one or more parameter objectives for the multi-material component, the model of the multi-material components having the gradient of the first material and the second material is based on the model of the first material, the model of the second material, and the observed data.

Additionally or alternatively to any of the embodiments above, the operating parameter values for the additive manufacturing system may be output from the model of the multi-material components having the gradient of the first material and the second material based on the predetermined values of each of the one or more parameter objectives for the multi-material component.

Additionally or alternatively to any of the embodiments above, the samples of the plurality of samples may be formed using the additive manufacturing system.

Additionally or alternatively to any of the embodiments above, the parameter values of the additive manufacturing system may include values of one or more of a laser power, a laser velocity, and a laser hatch.

Additionally or alternatively to any of the embodiments above, the one or more parameter objectives for one or more of the component formed with the first material, the component formed with the second material, and the multi-material component may include one or both of density and surface roughness.

Additionally or alternatively to any of the embodiments above, the one or more parameter objectives for the component formed with the first material may be one of: 1) one or more parameter objectives for a component formed with only the first material and 2) one or more parameter objectives for a multi-material component at a location of the multi-material component formed with only the first material; and the one or more parameter objectives for the component formed with the second material may be one of: 1) one or more parameter objectives for a component formed with only the second material and 2) one or more parameter objectives for a multi-material component at a location of the multi-material component formed with only the second material.

Additionally or alternatively to any of the embodiments above, the observed data from the plurality of samples may have a gradient of the first material and the second material and may be taken along the gradient of the first material and the second material in the multi-material component at a same gradient mixture location of each sample of the plurality of samples.

Additionally or alternatively to any of the embodiments above, the predetermined values of each of the one or more parameter objectives for the multi-material component may occur at a gradient mixture location of the multi-material component that is the same as the gradient mixture location at which observed data is taken from the plurality of samples.

Additionally or alternatively to any of the embodiments above, the plurality of samples may include five (5) or more samples having the gradient of the first material and the second material.

Additionally or alternatively to any of the embodiments above, the additive manufacturing system may include a selective laser melting (SLM) system.

Another illustrative instance of the disclosure may include a computer readable medium having stored thereon in a non-transitory state a program code for use by a computing device, the program code causing the computing device to execute a method of operating an additive manufacturing system comprising: receiving a selection of a first material; receiving a selection of a second material; establishing operating parameter values for the additive manufacturing system based on the first material and the second material. The operating parameter values may be configured to cause the additive manufacturing system to form, at least in part, a component using the first material and the second material and having a gradient of the first material and the second material.

Additionally or alternatively to any of the embodiments above, the method may further comprise receiving a selection of one or more objectives for parameters of the component; and wherein the establishing operating parameter values for the additive manufacturing system is based on the first material, the second material, and the one or more objectives for parameters of the component.

Additionally or alternatively to any of the embodiments above, the method may further comprise developing an algorithm based on the first material and the second material; and wherein the algorithm is configured to output the operating parameter values.

Additionally or alternatively to any of the embodiments above, the algorithm may be developed based on the first material, the second material, and observed data from a plurality of sample components formed using the first material and the second material, each sample component of the plurality of sample components may have a gradient of the first material and the second material.

Additionally or alternatively to any of the embodiments above, each sample component of the plurality of sample components was formed using a set of operating parameter values of the additive manufacturing system that is different than sets of operating parameter values of the additive manufacturing system used to form the other sample components of the plurality of sample components.

Additionally or alternatively to any of the embodiments above, the method may further comprise outputting a control signal to cause the additive manufacturing system to form, at least in part, the component.

Another illustrative instance of the disclosure may include a controller of an additive manufacturing system comprising: a processor; and memory configured to store in a non-transitory state instructions executable by the processor to cause the processor to: accept a selection of a first material; accept a selection of a second material; identify one or more operating parameter values for the additive manufacturing system based on the first material and the second material; and controlling operation of the additive manufacturing system according to the one or more operating parameter values to form a component using the first material and the second material.

Additionally or alternatively to any of the embodiments above, the component may have a gradient of the first material and the second material and the one or more operating parameter values may be identified based on desired values of one or more parameter objectives at a gradient mixture location of the gradient of the first material and the second material.

Additionally or alternatively to any of the embodiments above, the instructions executable by the processor may be further configured to cause the processor to: accept observed data associated with a plurality of sample components formed using the first material and the second material and having a gradient of the first material and the second material; and develop an algorithm configured to output the one or more operating parameter values based on the first material, the second material, and the observed data.

Additionally or alternatively to any of the embodiments above, a model of the first material for determining parameter values of the additive manufacturing system based on one or more parameter objectives for parameters of the component and a model of the second material for determining parameter values of the additive manufacturing system based on the one or more parameter objectives may be stored in a model database and used by the processor to determine the one or more operating parameter values in response to selection of the first material and selection of the second material.

The above summary of some example embodiments is not intended to describe each disclosed embodiment or every implementation of the disclosure.

BRIEF DESCRIPTION OF THE DRAWINGS

The disclosure may be more completely understood in consideration of the following detailed description of various embodiments in connection with the accompanying drawings, in which:

FIG. 8 is a schematic chart of illustrative values of operating parameters for an additive manufacturing system by composition of a multi-material component.

Figure 1:
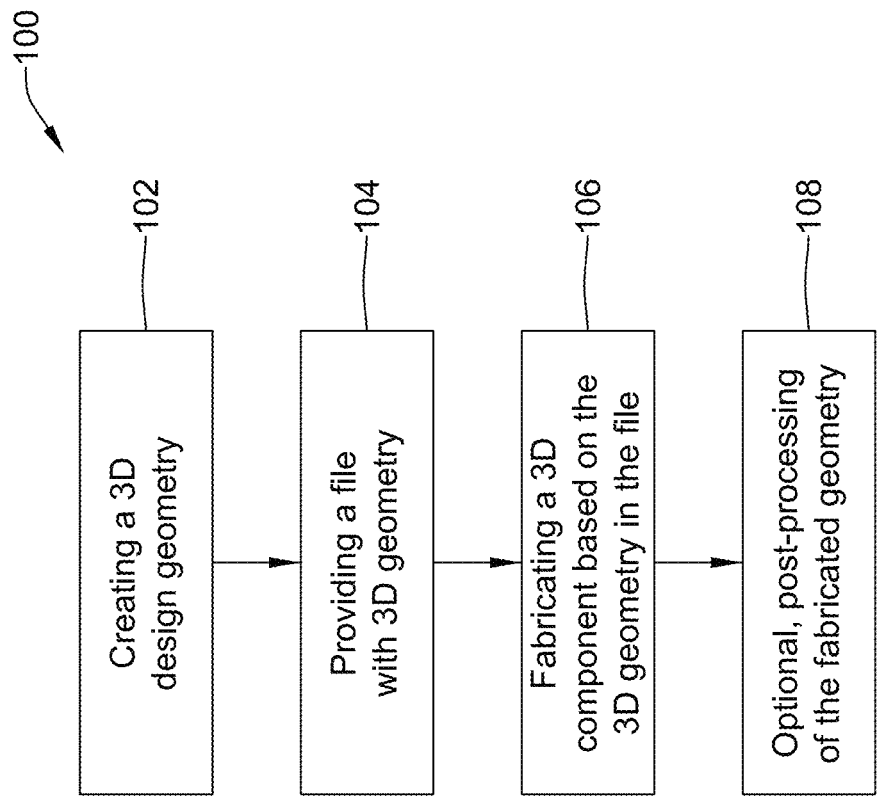
FIG. 1 is a schematic flow diagram of an illustrative additive manufacturing method.

While the disclosure is amenable to various modifications and alternative forms, specifics thereof have been shown by way of example in the drawings and will be described in detail. It should be understood, however, that the intention is not to limit aspects of the claimed disclosure to the particular embodiments described. On the contrary, the intention is to cover all modifications, equivalents, and alternatives falling within the spirit and scope of the claimed disclosure.

DESCRIPTION

For the following defined terms, these definitions shall be applied, unless a different definition is given in the claims or elsewhere in this specification.

All numeric values are herein assumed to be modified by the term "about", whether or not explicitly indicated. The term "about" generally refers to a range of numbers that one of skill in the art would consider equivalent to the recited value (i.e., having the same function or result). In many instances, the term "about" may be indicative as including numbers that are rounded to the nearest significant figure.

The recitation of numerical ranges by endpoints includes all numbers within that range (e.g., 1 to 5 includes 1, 1.5, 2, 2.75, 3, 3.80, 4, and 5).

Although some suitable dimensions, ranges and/or values pertaining to various components, features and/or specifications are disclosed, one of skill in the art, incited by the present disclosure, would understand desired dimensions, ranges, and/or values may deviate from those expressly disclosed.

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The following detailed description should be read with reference to the drawings in which similar elements in different drawings are numbered the same. The detailed description and the drawings, which are not necessarily to scale, depict illustrative embodiments and are not intended to limit the scope of the claimed disclosure. The illustrative embodiments depicted are intended only as exemplary. Selected features of any illustrative embodiment may be incorporated into an additional embodiment unless clearly stated to the contrary.

As discussed above, additive manufacturing facilitates fabrication of designs that are difficult to or impossible to fabricate using known techniques, such as using dies, molding techniques, extrusion techniques, conventional machining techniques, and/or other known fabrication techniques. Generally, additive manufacturing may refer to fabrication techniques for rapid prototyping and manufacturing of parts that allow three-dimensional (3D) digital models (e.g., computer aided design (CAD) designs, etc.) to be converted to three dimensional objects or components by depositing multiple thin layers of material according to a series of two-dimensional (2D), cross-sectional deposition maps sliced from the 3D digital mode. Additive manufacturing may comprise deposition of materials in a variety of different states including, but not limited to liquid, powder, fused material, etc. Example materials that may be processed using additive manufacturing techniques include, but are not limited to, metals, alloys, ceramics, polymers, composites (e.g., metal composites, polymer composites, metal-polymer composites, etc.), airy structures, multi-phase materials, etc.

FIG. 1 depicts an illustrative additive manufacturing technique or method 100. Method 100 may include creating 102 a 3D design of a geometry. In some cases, the 3D design of the geometry may be created with a CAD software, stored in a file, and the file may be provided 104 to an additive manufacturing system. Prior to (e.g., by the CAD software and/or other suitable software) and/or after being provided to the additive manufacturing system, the file with the 3D design may be converted to a file that is readable by the additive manufacturing system to fabricate component from the created 3D design (e.g., a stereolithography (STL) format and/or other suitable formats). Once, the file is in a format readable by the additive manufacturing system, the additive manufacturing system may fabricate 106 the geometry or component of the 3D design based on the file. Although not required, the fabricated geometry of the 3D design may be post-processed 108 to finalize the geometry or component. Example post-processing techniques include, but are not limited to, sanding, smoothing, sand blasting, plating, coating, painting, lathing, etc.

There are a variety of additive manufacturing techniques. Example additive manufacturing techniques include, but are not limited to, stereolithography (SLA), digital light processing (DLP), fused deposition modeling (FDM), selective laser sintering (SLS), selective laser melting (SLM) (e.g., also known as direct metal laser melting (DMLM) and/or laser powder bed fusion (LPBF)), electronic beam melting (EBM), etc. Although the concepts disclosed herein may be described primarily with respect to SLM, these concepts may be used in other suitable additive manufacturing techniques.

SLM may utilize a high power-density laser to melt and fuse powders (e.g., metallic powders). Using SLM, a component may be built by selectively melting and fusing powders within and between layers according to a pattern determined from a CAD file of 3D geometry design. SLM may be a desirable additive manufacturing technique because it has been shown to produce near full density functional components.

Any suitable materials may be used in SLM techniques. Suitable materials include materials that exist in atomized (e.g., powder) form. Although it may be desirable to have powders in spherical form, this is not required. Example materials commonly used for SLM include, but are not limited to, copper, aluminum, tungsten, stainless steel, tool steel, cobalt chromium, titanium, ceramics, composites, and/or other suitable materials.

Figure 2:
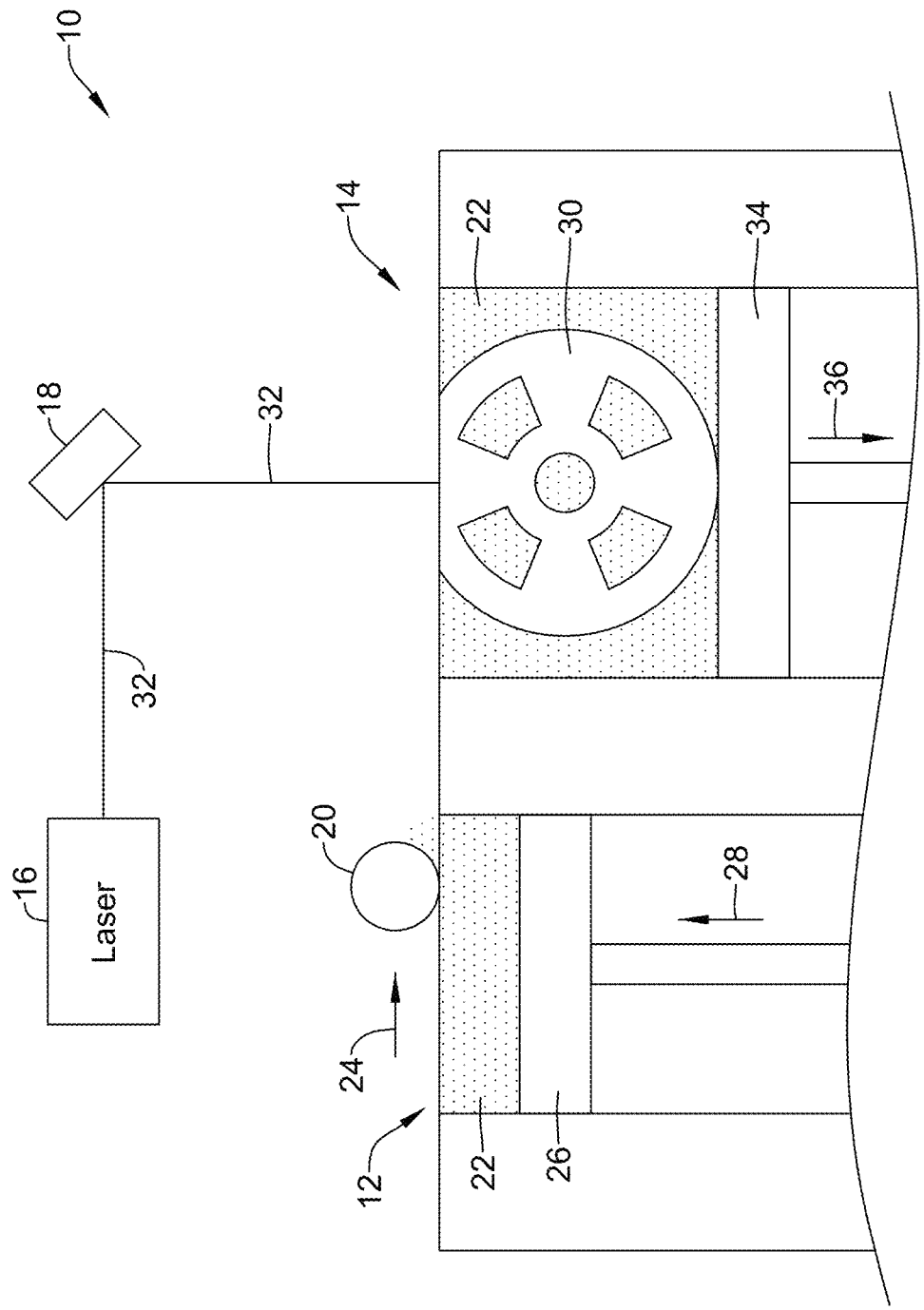
FIG. 2 is a schematic diagram of an illustrative selective laser melting system.

FIG. 2 depicts an example SLM system 10 configured to fabricate 3D components based on a 3D design geometry in a CAD file. The SLM system 10 may include, among other features, a powder delivery bed 12, a fabrication powder bed 14, a laser 16, a scanner system 18, a roller 20 or other suitable powder moving component, and/or one or more other suitable components.

The powder delivery bed 12 may be configured to deliver powder 22 to the roller 20 for transportation to the fabrication powder bed 14 in response to movement of the roller 20 in the direction of arrow 24. The powder delivery bed 12 may include a powder delivery piston 26 configured to move in the direction of arrow 28 to advance the powder 22 to the roller 20. The powder delivery piston 26 may be configured to advance in a direction of arrow 28 at one or more predetermined continuous or non-continuous rates. In some cases, the powder delivery piston 26 may be biased to move in the direction of arrow 28 by a biasing element (e.g., a spring, etc.), where a weight of the powder 22 may counter balance the biasing element. Alternatively or in addition, the powder delivery piston 26 may be in communication with a controller of the SLM system 10 and configured to advance in the direction of the arrow 28 in response to a control signal from the controller specifying an advancement distance and/or rate configured to facilitate forming a layer of powder 22 of a predetermined thickness on the fabrication powder bed 14. Further, the roller 20 may be in communication with the controller of the SLM system 10 to facilitate forming layers of powder 22 with the predetermined thickness. A thickness of a layer is commonly in a range from about twenty (20) micrometers to about one hundred (100) micrometers.

The fabrication powder bed 14 may be configured to receive powder 22 that is configured to be melted into a component 30 (e.g., a 3D component and/or other suitable component). Once a layer is formed on the fabrication powder bed 14, a laser beam 32 from the laser 16 may be directed by the scanner system 18 to one or more locations on the layer to melt the powder 22 at the one or more locations and form a layer of the component 30. The scanner system 18 may include and/or may be in communication with a controller of the SLM system 10 and may be configured to direct the laser beam 32 to locations on the layer of powder 22 based on a layer of the 3D geometry in the CAD file being used to create the component 30. The laser beam 32 may be configured to melt particles of powder 22 forming the layer on the fabrication powder bed 14 to other particles of powder 22 in the layer and/or to particles of one or more previous layers of powder 22 on the fabrication powder bed 14 to form the component 30.

In some cases, the scanner system 18 may include a motor and/or a mirror. When included, the motor may be configured to move and/or adjust the mirror to facilitate directing the laser beam 32 to one or more locations of the layer of powder on the fabrication powder bed 14.

The fabrication powder bed 14 may include a fabrication piston 34 configured to move in a direction of arrow 36 to facilitate receiving additional layers of powder 22 in response to movement of the roller 20 in the direction of arrow 24. The fabrication piston 34 may be configured to advance in the direction of arrow 36 at one or more predetermined continuous or non-continuous rates. In some cases, the fabrication piston 34 may be biased to move in a direction opposite of arrow 36 by a biasing element (e.g., a spring, etc.), where a weight of the powder 22 and the component 30 at the fabrication powder bed 14 may counter balance the biasing element. Alternatively or additionally, the fabrication piston 34 may be in communication with a controller of the SLM system 10 and configured to advance in the direction of the arrow 36 in response to a control signal from the controller specifying an advancement distance and/or rate configured to facilitate forming a layer of powder 22 of a predetermined thickness on the fabrication powder bed 14 and a resulting layer of the component 30.

The SLM system 10 may have a variety of parameters (e.g., operating parameters) configurable to obtain different values of one or more parameter objectives for the components 30 (e.g., objectives for parameters of the components 30). Example configurable parameters of the SLM system 10 may include, but are not limited to, parameters related to the laser 16, system operation parameters, and/or other suitable parameters. Example adjustable parameters relating to the laser 16 may include, but are not limited to, infill/core parameters (e.g., scan strategy, power, speed, spacing, beam diameter, beam offset, alternating angle, etc.), contour/boundary parameters (e.g., down/up skin power, down/up skin speed, thickness, beam offset, corridor, power, speed, etc.), support structure parameters (e.g., power, speed, etc.), and/or other suitable adjustable parameters relating to the laser 16. Example adjustable parameters relating to the system operations parameters include, but are not limited to, layer thickness parameters, gas flow parameters, build plate temperature parameters, scaling factor parameters, and/or other suitable adjustable parameters relating to the system operation.

The parameter objectives for the components 30 may include, among other types of parameters, mechanical property parameters, physical property parameters, and metallurgical properties. Example mechanical properties of the components 30 may include, but are not limited to, ultimate tensile strength, yield strength, strains, fatigue life, hardness, surface roughness, etc. Example, physical property parameters may include, but are not limited to, density, elastic modulus, etc. Example metallurgical property parameters may include, but are not limited to, features of crystal structure, grain size and morphology, etc.

Figure 3:
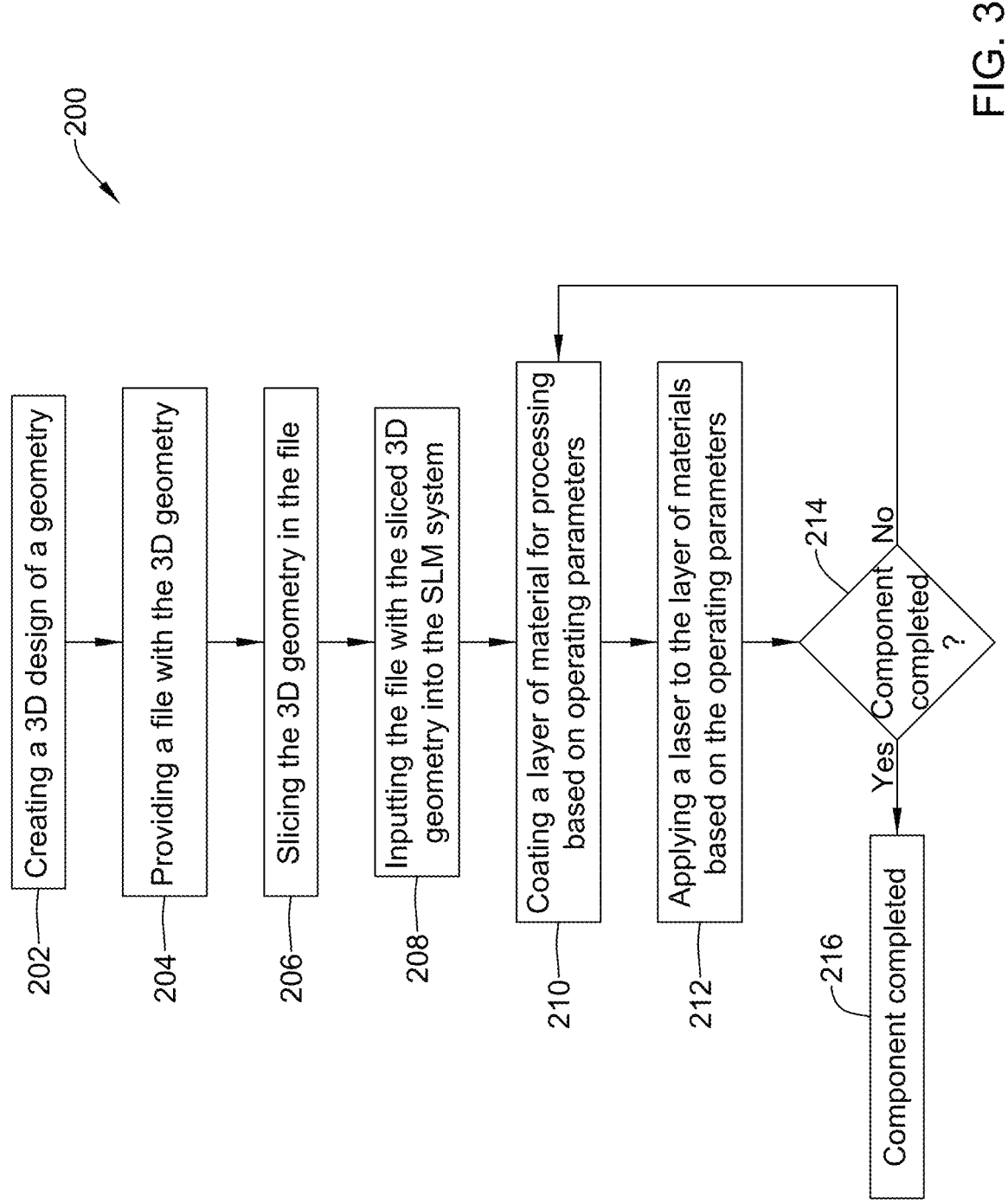
FIG. 3 is a schematic flow diagram of an illustrative method of selective laser melting.

FIG. 3 depicts a method 200 of using an illustrative SLM system (e.g., the SLM system 10 and/or other suitable SLM system). The method 200 may include creating 202 a 3D design of a geometry using CAD software and creating or providing 204 a file with the 3D design of the geometry. Once the 3D geometry has been created in a file, the 3D geometry may be sliced 206 and stored in the file or in a new file, where each slice of the 3D geometry may be used to map out laser positioning for a layer of a component formed from the 3D geometry. Once the 3D geometry has been sliced, a file containing the sliced 3D geometry may be inputted 208 to the SLM system for use in creating a component based on the 3D geometry. Alternatively, the 3D geometry may be sliced in the SLM system after a file containing the 3D geometry is provided to or formed in the SLM system. In some cases, the file provided to the SLM system may include one or more operating parameters for the SLM system. Additionally or alternatively, one or more operating parameters for the SLM system may be set at the SLM system (e.g., at a user interface of a controller of the SLM system and/or at one or more other suitable locations).

Once a file or data containing the sliced 3D geometry is located at the SLM system, a layer of powder (e.g., the powder 22 and/or other suitable powder) may be coated 210 on a fabrication powder bed (e.g., the fabrication powder bed 14 and/or other suitable powder bed) for processing based on operating parameters for the SLM system. In one example, the operating parameters in the file containing the sliced 3D geometry and/or as set at or by the SLM system may specify a value for a layer thickness, a value for a laser speed/velocity, a value for a laser power, and a value for a laser hatching (e.g., row spacing for consecutive rows of the laser) and/or other suitable operating parameters. Once the layer has been coated on the fabrication powder bed, a laser beam (e.g., the laser beam 32 and/or other suitable laser beam) from a laser (e.g., the laser 16 and/or other suitable laser) may be applied 212 to the layer of material on the fabrication powder bed to form a layer of the component based on the map created by a slice of the 3D geometry and the operating parameters in the file containing the sliced 3D geometry and/or as set at the SLM system.

After the laser has been applied to the layer of material according to the slice of the 3D geometry and the operating parameters, the SLM system may determine 214 if the component is completed. If the component is not completed, the method 200 may include coating 210 another layer of material and the laser may be applied 212 to form the next layer of the component using the next sequential slice of the 3D geometry as a map. This process repeats until all of the slices of the 3D geometry have been addressed and the component is complete 216.

Additive manufacturing techniques and SLM techniques, in particular, require operating parameters for the additive manufacturing system that have values which are dependent on material to be used for forming a component and parameter objectives for the formed component. For example, in SLM systems, parameter values for the laser may depend on a type of material to be used to form a component and particular parameter objectives for the component. Such parameter values for the laser include, but are not limited to, values for laser power, laser velocity, and hatch spacing of the laser (e.g., spacing between lines of the laser).

When a component is to be made from a single material, setting values for operating parameters of the additive manufacturing system may be relatively straight forward as it is necessary to only consider how a single material will be affected by different values or sets of values of operating parameters for the additive manufacturing system. However, when two or more materials are used by an additive manufacturing system to form multi-material components having predetermined values for component parameter objectives, it may be difficult to determine values of operating parameters for the additive manufacturing system to achieve predetermined values for the parameter objectives of the end-component due to, among other complications, mixing of materials at interfaces between two or more materials and the various operating parameters required (e.g., that change) along the interfaces between two or more materials to achieve the desired values of the parameter objectives. For example, when making a component of two or more materials with a SLM system, graded interfaces (e.g., a gradient, as discussed in greater detail below) bond heterogeneous materials together and due to the composition of the graded interface gradually changing with respect to location, any given point on the graded interface may require a unique set of laser parameters (e.g., the laser parameters may change as a function of the composition of the graded interface) to achieve predetermined values for component parameter objectives (e.g., based on levels of bonding between the heterogeneous materials).

Predetermined values of component parameter objectives may be any desired values. In one example, the predetermined values of component parameter objectives may be desired set values (e.g., inputted into the additive manufacturing system or obtained from a database of or in communication with the additive manufacturing system) for one or more component parameter objectives. Alternatively or in addition, one or more predetermined values of component parameter objectives may be optimized values given a set of one or more component parameter objectives to consider when producing the component. For example, if surface roughness and material density operating parameters of the component are to be considered, values of operating parameters for the additive manufacturing system may be set to achieve a component with a best possible combination of surface roughness and material density.

As more materials are used to form the multi-material component, as more values of operating parameters are to be determined, and/or as more parameter objectives of the end-component are considered, establishing values of operating parameters becomes computationally too complex for a user to determine without a computing device. As discussed in greater detail below, a technique is provided for establishing values of operating parameter values for additive manufacturing systems (e.g., SLM systems) based, at least in part, on knowing the materials to be used in forming a multi-material component with the additive manufacturing system to form a component having predetermined values for one or more component parameter objectives. The techniques discussed herein may be used by additive manufacturing systems to improve the precision with which a multi-material component may be made therefrom.

Figure 4:
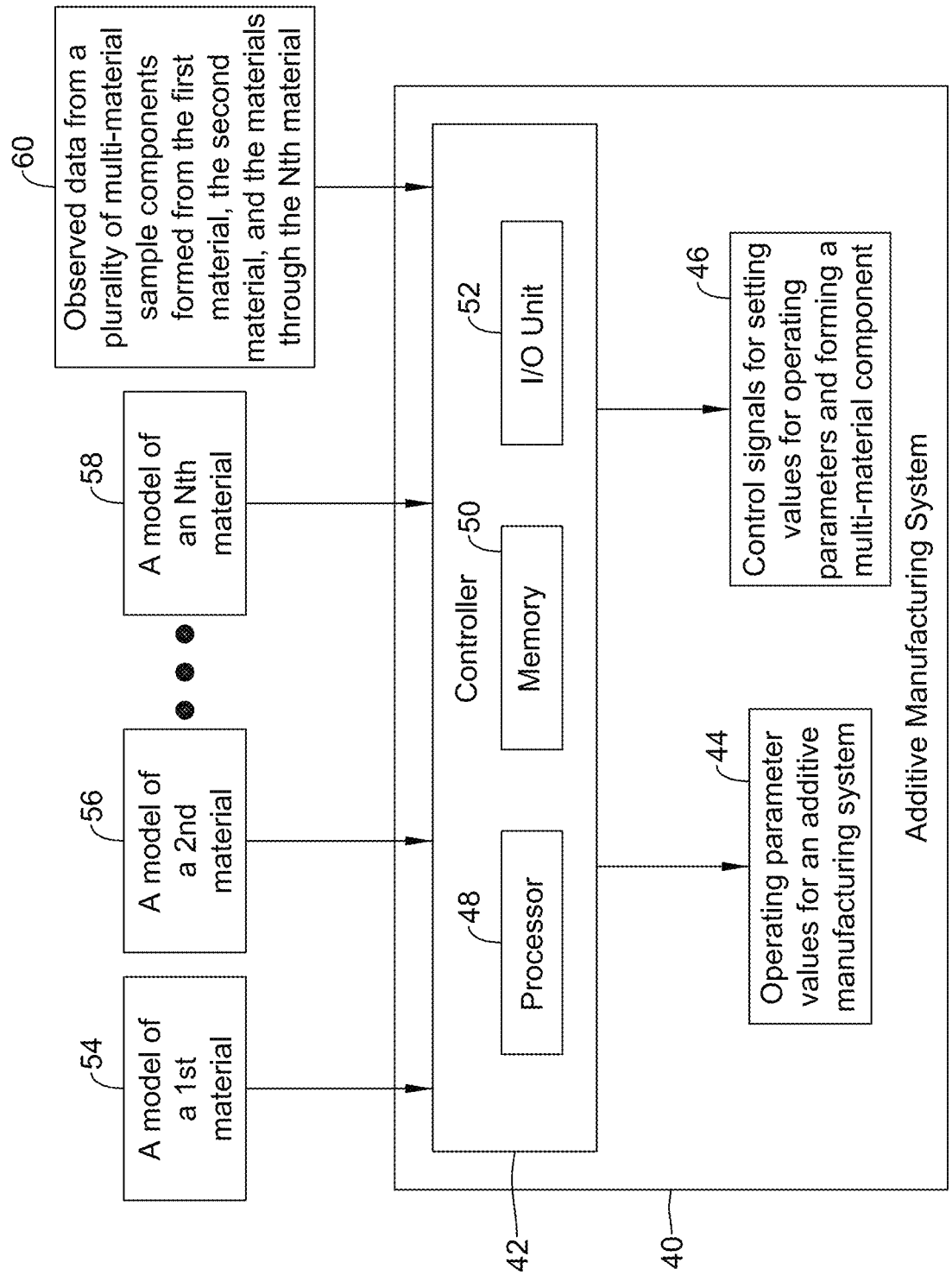
FIG. 4 is a schematic box diagram of an illustrative system of controlling an additive manufacturing system to form multi-material components.

FIG. 4 depicts a schematic box diagram of an illustrative additive manufacturing system 40 (e.g., an SLM system and/or other suitable additive manufacturing system) configured to form a multi-material component having predetermined values of end-component parameter objectives. In some cases, the additive manufacturing system 40 may include a controller 42 (e.g., a computing device) configured to establish values 44 for operating parameters of the additive manufacturing system 40. Further, the controller 42, in some cases, may be configured to control the operation of the additive manufacturing system 40 by establishing control signals 46 for setting values for operating parameters and/or forming a multi-material component based on established values for the operating parameters and then, sending out or otherwise outputting these control signals to associated components of the additive manufacturing system 40 to effect the forming of the multi-material component in communication with the SLM system 10.

The controller 42 may be any suitable computing device configured to process data of or for the additive manufacturing system 40. The controller 42 may be a component of, or otherwise included in, the additive manufacturing system 40, as depicted in FIG. 4, and/or the controller 42, or a portion of the controller 42, may be a component separate from and in communication with the additive manufacturing system 40. In some cases, the controller 42 may communicate with a remote server and/or may be included in a remote server. When the controller 42, or at least a part of the controller 42, is a component separate from a structure of the additive manufacturing system 40, the controller 42 may communicate with electronic components of the additive manufacturing system 40 over one or more wired or wireless connections or networks (e.g., local area networks (e.g., LAN) and/or wide area networks (WAN)).

The illustrative controller 42 may include, among other suitable components, one or more processors 48, memory 50, and/or an I/O unit 52. Example other suitable components of the controller 42 that are not depicted in FIG. 4 may include, but are not limited to, communication components, a user interface, a touch screen, a display screen, selectable buttons, a housing, and/or other suitable components of a controller. As discussed above, one or more components of the controller 42 may be separate from the additive manufacturing system 40 and/or incorporated into the additive manufacturing system 40, as depicted in FIG. 4.

The processor 48 of the controller 42 may include a single processor or more than one processor working individually or with one another. The processor 48 may be configured to execute instructions, including instructions that may be loaded into the memory 50 and/or other suitable memory. Example components of the processor 48 may include, but are not limited to, microprocessors, microcontrollers, multi-core processors, graphical processing units, digital signal processors, application specific integrated circuits (ASICs), field programmable gate arrays (FPGAs), discrete circuitry, and/or other suitable types of data processing devices.

The memory 50 of the controller 42 may include a single memory component or more than one memory component each working individually or with one another. Example types of memory 50 may include random access memory (RAM), EEPROM, FLASH, suitable volatile storage devices, suitable non-volatile storage devices, persistent memory (e.g., read only memory (ROM), hard drive, Flash memory, optical disc memory, and/or other suitable persistent memory) and/or other suitable types of memory. The memory 50 may be or may include a non-transitory computer readable medium. The memory may include instructions executable by the processor 48 to cause the processor to perform one or more of the methods and/or techniques described herein.

The I/O units 52 of the controller 42 may include a single I/O component or more than one I/O component each working individually or with one another. Example I/O units 52 may be or may include any suitable types of communication hardware and/or software including, but not limited to, communication ports configured to communicate with electronic components of the additive manufacturing system 40, and/or configured other suitable computing devices or systems. Example types of I/O units 52 may include wired ports, wireless ports, radio frequency (RF) ports, Low-Energy Bluetooth ports, Bluetooth ports, Near-Field Communication (NFC) ports, HDMI ports, WiFi ports, Ethernet ports, VGA ports, serial ports, parallel ports, component video ports, S-video ports, composite audio/video ports, DVI ports, USB ports, optical ports, and/or other suitable ports.

The controller 42 may be configured to establish operating parameter values for the additive manufacturing system 40 to form, at least in part, the multi-material component using two or more materials (e.g., a first material, a second material, an $N^{th}$ material, etc.). To facilitate establishing the operating parameter values for the additive manufacturing system 40, the controller 42 may have, may be configured to determine, and/or may be configured to receive a model 54 of a first material to be used in the multi-material component, a model 56 of a second material to be used in the multi-material component, and models of materials through a model 58 of an $N^{th}$ material to be used in the multi-material component. The models 54, 56, 58 may be configured to output parameter values (e.g., values of operating parameters) of the additive manufacturing system 40 based on one or more parameter objectives for a component formed with a material associated with the model. Further, the controller 42 may be configured to receive data 60 (e.g., observed data) from a plurality of multi-material sample components formed from the first material, the second material, and through the Nth material. Based on the models 54, 56, 58 of the materials to be used to form the multi-material component and the data from the multi-material sample components, the controller may determine one or more operating parameter values 44 and, optionally, send out control signals 46 setting values for operating parameters and/or for forming the multi-material component using the determined values of the operating parameters of the additive manufacturing system 40. The models 54, 56, 58 of the materials used to form the multi-material component may be stored at any suitable location including, but not limited to, the memory 50 and/or a remote server. Although FIG. 4 depicts the models 54, 56, 58 of the materials used to form the multi-material component as being inputted into or received by the controller 42, the controller 42 may be configured to develop models 54, 56, 58 from data obtained from components (e.g., samples) made with a material (e.g., components made with a single material and/or multi-material components at a location formed with only the single material) for which the model 54, 56, 58 is being developed. Additionally or alternatively, one or more computing devices other than the controller 42 may be utilized to develop the models 54, 56, 58 and once developed, the models may be provided to the controller 42. The data used to form the models 54, 56, 58 may be stored in the memory 50 of the controller 42, at a remote server, and/or at one or more other suitable locations in communication with the controller 42. In some cases, the data usable to form the models 54, 56, 58 may be directly used by the controller 42, rather than or in addition to, using the models.

The data used to form the model (e.g., models 54, 56, 58) of a material may include any suitable data for modeling a material to produce a component using the additive manufacturing system 40. In one example, the data used to form a model of a material may include, but is not limited to, data from one or more components formed from the material and formed using an additive manufacturing system, where data from a component may include, among other suitable data, the material of the component, values of one or more operating parameters used to form the component and for which the model is to be formed, and values for one or more parameter objectives of the component formed using the values of the one or more operating parameters. Data to form a model for a component formed from a particular material may be relatively simple to obtain when compared to obtaining data from a multi-material component, as single-material components historically have been simpler to form using additive manufacturing techniques than multi-material components.

A model (e.g., the models 54, 56, 58) of a material may be developed based on the data from one or more components formed from the material and formed using an additive manufacturing system with any suitable model development techniques. In some case, the model of the material may be formed using data from a plurality of components formed from the material and from the additive manufacturing system using a regression analysis and/or other suitable model development techniques. In one example, the data from the one or more components may be inputted into a computing device and software may be configured to develop a model that fits to the data.

A number of components from which data is to be obtained to form a model of material may vary based on a desired accuracy of the model. In one example, using more components from which the data may be obtained, may result in a more accurate model. Example numbers of components from which data may be obtained to form a model of material may include ten (10) components, twenty (20) components, thirty (30) components, fifty (50) components, and/or other suitable numbers of components.

In some cases, different models may be developed for each set of operating parameters for the additive manufacturing system 40 and/or different models may be developed for each set of parameter objectives for a component formed with the additive manufacturing system 40. Alternatively or in addition, a master model may be developed or utilized for a particular material taking into account all possible operating parameters for the additive manufacturing system 40 and/or all of the parameter objectives for a formed component using the particular material.

In an example model for when a material density and surface roughness are important parameter objectives for a component made of copper by the additive manufacturing system 40, the model may be configured to model how different parameter values of the additive manufacturing system 40 change values of the material density and material roughness of copper components formed with the additive manufacturing system 40. Further, the model in the example may be configured to output a parameter value or a set of parameter values of the additive manufacturing system 40 that are configured to achieve a particular or desired value of one or both of the material density and the material roughness. For instances, parameter values may be determined to achieve an optimal or otherwise a desired combination of material density and material toughness. As such, data to create the model in the example may be taken from sample copper components and for each component, have a set of operating parameters for the additive manufacturing system 40 that were used to form the sample copper component and resulting values from the sample copper components for the one or more parameter objectives.

The data 60 from a plurality of multi-material sample components may be stored at any suitable location including, but not limited to, the memory 50, a remote server, and/or one or more other suitable locations in communication with the controller. In some cases, a user may enter the data directly into (e.g., into a database of) the additive manufacturing system 40 (e.g., the controller 42 and/or other suitable component of the additive manufacturing system 40) and/or the controller 42 may be configured to pull the data 60 from a database of a computing device (e.g., a database of a remote server or other suitable computing device) in communication with the controller 42.

The data 60 from a plurality of multi-material sample components may be data from multi-material sample components having a gradient of a first material and a second material. The gradient of the first material and the second material may be a mixture of the first material and the second material that gradually changes from one hundred percent of the first material to one hundred percent of the second material. For each sample component having the gradient of the first material and the second material, data may be obtained that includes a set of parameter values used by the additive manufacturing system 40 to form the sample and an associated measured value for each of the one or more parameter objectives for the multi-material component.

The measured value for each of the one or more parameter objectives for a sample multi-material component may be obtained along the gradient of the first material and the second material. For example, the measured value for each of the one or more parameter objectives may be measured or taken along the gradient of the first material and the second material in the sample multi-material component at a desired gradient mixture location. In some cases, for each sample multi-material component of the plurality of sample multi-material components, the measured value for each of the one or more parameter objectives may be measured or taken along the gradient of the materials at a same gradient mixture location. The gradient mixture location may be defined in any suitable manner including, but not limited to, by a distance from a location of a one hundred percent concentration of one of the materials forming the gradient, by a percent mixture (e.g., by atomic weight, by particle number, etc.), and/or by one or more other suitable manner of identifying a location along a gradient of two or more materials.

Data 60 from any suitable number of sample multi-material components having a gradient of the first material and the second material may be identified and/or otherwise obtained. In some cases, data 60 from a minimum predetermined number of sample multi-material components may be obtained for each set of the one or more parameter objectives of multi-material components. In some cases, the minimum predetermined number of multi-material components may be determined as a balance between needing enough samples to reduce errors in producing parameter values for the additive manufacturing system 40 to form a multi-material component having desirable values of parameter objectives and the difficulty in creating multi-material components usable as sample components. Example minimum predetermined numbers of multi-material components may be at least one (1), at least two (2), at least three (3), at least four (4), at least five (5), at least six (6), at least ten (10) or more sample multi-material components having a gradient of the first material and the second material. In one example, the minimum predetermined number of sample multi-material components may be at least five (5) sample multi-material components to determine parameter values for the additive manufacturing system 40 that facilitate creating a multi-material component having predetermined values for the parameter objectives. In an example in which stainless steel 316L and copper are the two materials used to form multi-material components, it has been found that using data from five (5) sample multi-material components formed from stainless steel 316L and copper as the data 60 may be sufficient to produce parameter values for the additive manufacturing system 40 that may result in forming a stainless steel 316L and copper multi-material component having desired values of parameter objectives that are within an acceptable level of accuracy (e.g., have a low error rate).

In an example of establishing operating parameter values for the additive manufacturing system to form, at least in part, a multi-material component using copper and stainless steel 316L and having predetermined and/or desired values for material roughness and material density parameter objectives, the controller 42 may be configured to identify the model of the copper, identify the model of the stainless steel 316L, identify the data from sample components having a gradient of the copper and the stainless steel 316L that includes operating parameter values and associated values of material roughness and material density for each sample, and then, establish operating parameter values for the additive manufacturing system 40 to form, at least in part, the multi-material having a gradient of copper and stainless steel 316L. In some cases, the formed multi-material component may have the predetermined and/or desired values for material roughs and material density at a location along a gradient of the copper and the stainless steel 316L (e.g., at a gradient mixture location common to the gradient mixture location at which the data was obtained).

A model may be configured to output parameter values (e.g., values of operating parameters) for the additive manufacturing system 40 based on values of one or more parameter objectives for a multi-material component formed using the outputted parameter values. The model may be a model of the gradient of two or more materials. The model may be based on a model of each of the two or more materials (e.g., models 54, 56, 58 and/or other suitable models) and data 60 from a plurality of sample multi-material components formed from the two or more materials and including measured values of the one or more parameter objectives that are to be used for the multi-material component formed using the outputted parameter values.

In some cases, a different model of the multi-material component having the gradient of the two or more materials may be developed for each set of operating parameters for the additive manufacturing system 40 and/or a different model of the multi-material component having the gradient of the two or more materials may be developed for each set of parameter objectives for a component formed with the additive manufacturing system 40. Alternatively or in addition, a master model of the multi-material component having the gradient of the two or more materials may be developed or utilized for a particular set of two or more materials taking into account all possible operating parameters for the additive manufacturing system 40 and/or all of the parameter objects for a formed component using the particular material.

The model (e.g., the master model and/or other suitable model) of the multi-material component having the gradient of the two or more materials, when utilized, may be developed in any suitable manner. In some cases, a Gaussian Process may be used to develop the model. In one example, the models 54, 56, 58 of the material forming the multi-material component may be modeled in a defined a-D (a is the dimension of space) using the following signal decomposition:

$$R_i(s) = h_i(s)^T \beta_i + f_i(s) + \in_i(s), i \in I \quad (1)$$

where $h_i(s) = [h_{i1}(s), h_{i2}(s), \ldots, h_{iv_i}(s)]$ is a fixed set of regression functions with regression parameters $\beta_i = [\beta_{i,1}, \beta_{i,2}, \ldots, \beta_{i,v_i}]^T$, $f_i(s)$ represents a mean zero Gaussian Process (GP), and $\in_i(s)$ represents measurement noise with zero mean and $\sigma_\in^2$ variance. Here $s \in D \subset R^\alpha$ represents a location over a bounded study region D in a multi-dimensional parameter space.

One principle of the model of the multi-material component having the gradient of the two or more materials may be to use information from the models 54, 56, 58 (e.g., training models or training data) and the data 60 (e.g., process parameter observations from a target signal r) to make accurate predictions of how operating parameters of the additive manufacturing system 40 will affect values of parameter objectives. To achieve accurate predictions, a shared representation of all material properties (e.g., a shared representation of the models 54, 56, 58) may be defined as:

$$R(s) = \begin{pmatrix} R_1(s) \\ \vdots \\ R_N(s) \\ R_r(s) \end{pmatrix} = \begin{pmatrix} h_1(s)^T \beta_1 \\ \vdots \\ h_N(s)^T \beta_N \\ h_r(s)^T \beta_r \end{pmatrix} + \begin{pmatrix} f_1(s) \\ \vdots \\ f_N(s) \\ f_r(s) \end{pmatrix} + \begin{pmatrix} \epsilon_1(s) \\ \vdots \\ \epsilon_N(s) \\ \epsilon_r(s) \end{pmatrix} = h(s)^T \beta + f(s) + \epsilon(s) \quad (2)$$

where $h(s)=\text{diag}[h_1(s), \ldots, h_N(s), h_r(s)]$, and $\beta=[\beta_1^T, \ldots, \beta_N^T, \beta_r^T]^T$. The stochastic term $f(s)$ is a mean zero Multi-variate Gaussian Process (MGP) with covariance $\text{cov}_{ij}^f(s,s')=\text{cov}_{ij}(f_i(s), f_j(s'))$ that characterizes the inherent variability and stochastic deviations in process property, both within a material and across different materials. One feature provided by equation (2) may be that all or substantially all historical observations from training input (e.g., models 54, 56, 58 of single materials and/or data associated therewith) and limited observations from target material (e.g., data 60 from a plurality of sample multi-material components) to make predictions for the entire span of target material properties (e.g., parameter objectives of the multi-material component). Based on eq. (2), predictions of target material properties for the target material (e.g., the multi-material component formed by the additive manufacturing system 40) at any new input point in space s are a weighted combination of all historical observations and the target signal observations (e.g., the data 60 and/or other suitable observations). This weighted combination is characterized by a flexible covariance function $\text{cov}_{ij}^f(f_i(s), f_j(s'))$, an additive noise term $\epsilon(s)$, and a material-specific mean function $h(s)^T\beta$.

The function $f(s)$ may use a convolution processes (CP) to borrow information from the historical observations from the training input (e.g., models 54, 56, 58 and/or data associated therewith) and account for non-trivial commonalities in the data. This construction enables a highly flexible covariance structure that can handle heterogeneity in observed operating parameters for the additive manufacturing system 40. More specifically, multiple independent Gaussian white noise processes $\{X_m(s): m \in I\}$ may be shared between the model or function $f_r(s)$ for the multi-material component and functions or models 54, 56, 58 of materials used to form the multi-material component in a historical database $\{f_i(s): i \in I^H\}$ (e.g., stored in the controller 42, a remote server, and/or at one or more other suitable computing devices) Since latent functions are drawn from a GP, and if the latent functions are shared across all models 54, 56, 58 of materials used to form the multi-material components, then all models 54, 56, 58 can be expressed as a jointly distributed GP (e.g., the master model of the materials used to form the multi-material component). More specifically, outputs $\{R_i(s): i \in I\}$ may be constructed as follows:

$$R_r(s) = h_r(s)^T \beta_r + f_r(s) + \epsilon_r(s) = h_r(s)^T \beta_r + \Sigma_{m \in I} k_{mr}(s) * X_m(s) + \epsilon_r(s) \quad (3)$$

$$R_i(s) = h_i(s) + \beta_i + f_i(s) + \epsilon_i(s) = h_i(s)^T \beta_i + k_{ii}(s) * X_i(s) + \epsilon_i(s), \quad i \in I^H \quad (4)$$

where * defines a kernel convolution $$k_{mi}(s) * X_m(s) = \int_{-\infty}^{+\infty} k_{mi}(s-u) X_m(u) du,$$

$k_{ii}$'s are the kernels connecting latent function $X_i$ to output $R_i$, and $k_{ir}$'s are the kernels connecting the latent function $X_i$ to $R_r$.

Figure 5:
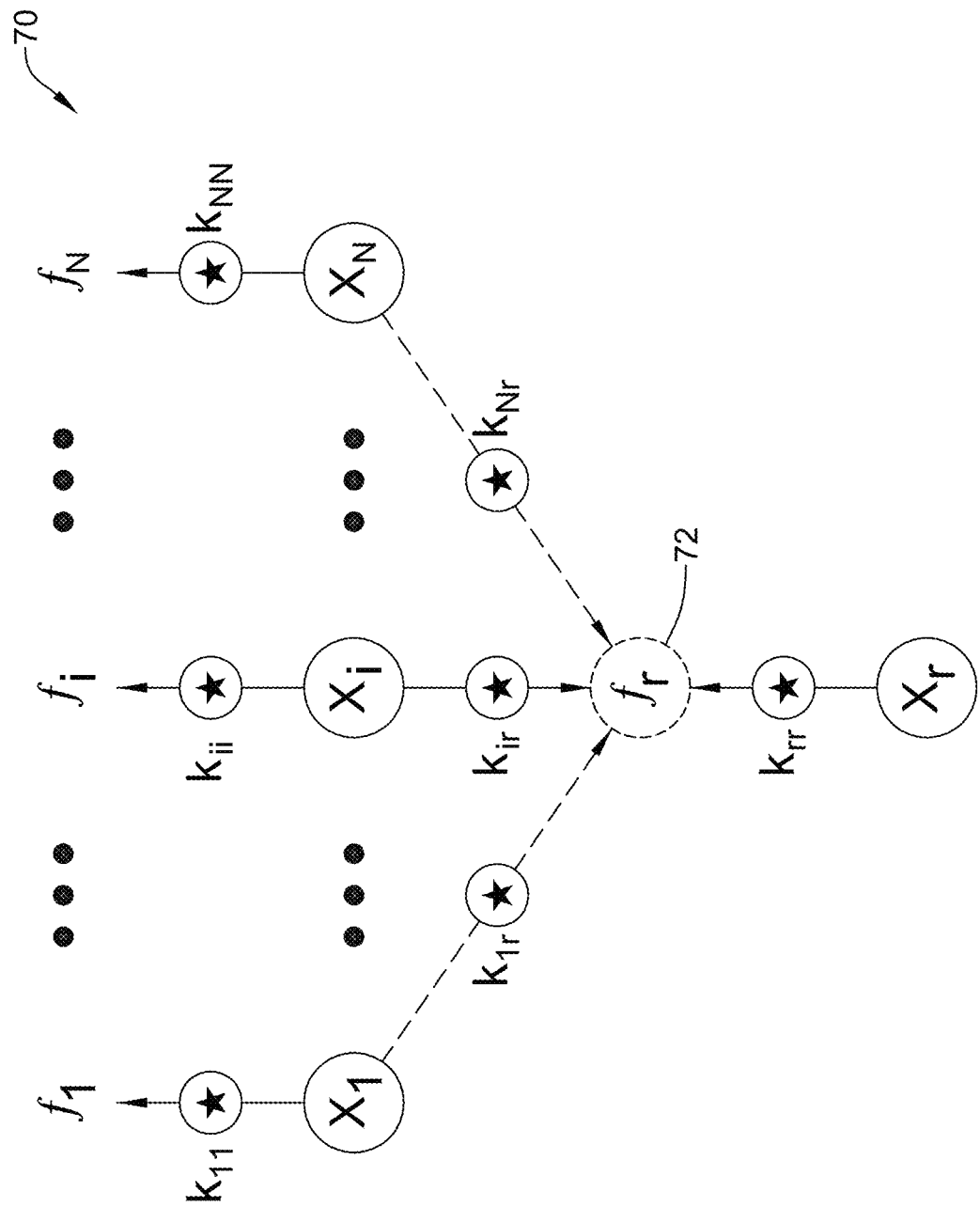
FIG. 5 is a schematic diagram of an illustrative structure of forming a model for identifying operating parameter values of an additive manufacturing system to form multi-material components.

As shown in FIG. 5 structure 70 of model or function (e.g., an algorithm), $f_r$, 72 for establishing operating parameter values for the additive manufacturing system 40 to form, at least in part, the multi-material component having predetermined values of each of one or more parameter objectives for the formed multi-material component may be quite flexible. The structure 70 may allow the model or function, $f_r$, 72 to possess unique properties encoded in $X_r$ (e.g., observed data 60) and $K_{rr}$, and shared features with training materials (e.g., data for models 54, 56, 58 of materials forming the multi-material component) are encoded in $X_i$ (e.g., $X_i$ may be data for a first material and $f_1$ may be the model based on the data for the first material, $X_i$ may be data for an $i^{th}$ material and $f_i$ may be the model based on the data for the $i^{th}$ material, and $X_N$ may be data for an $N^{th}$ material and $f_N$ may be the model for the $N^{th}$ material) and $k_{ir}$, $i \in I^H$, where $X_i$ may be used to predict parameter values of the additive manufacturing system 40 to form a single-material component having predetermined values of one or more parameter objectives. In addition, the structure may allow the information from the same latent function to be shared through different smoothing kernels ($K_{ir}$ vs. $k_{ii}$). As a result, the model or function 72 may have the ability to use useful knowledge from training inputs and observations through the different covariance parameters, resulting in a curve that may be used to predict operating parameters for the additive manufacturing system 40 to form a multi-material component having predetermined values of one or more parameter objectives.

Models (e.g., algorithms or functions) specific to a gradient mixture location may be developed according to the techniques discussed herein to establish operating parameters at each desired gradient mixture location in view parameter objectives for the multi-material components. In some cases, such models for each desired gradient mixture location may be combined to form a combined model configured to establish operating parameters at any desired gradient mixture location.

Figure 6:
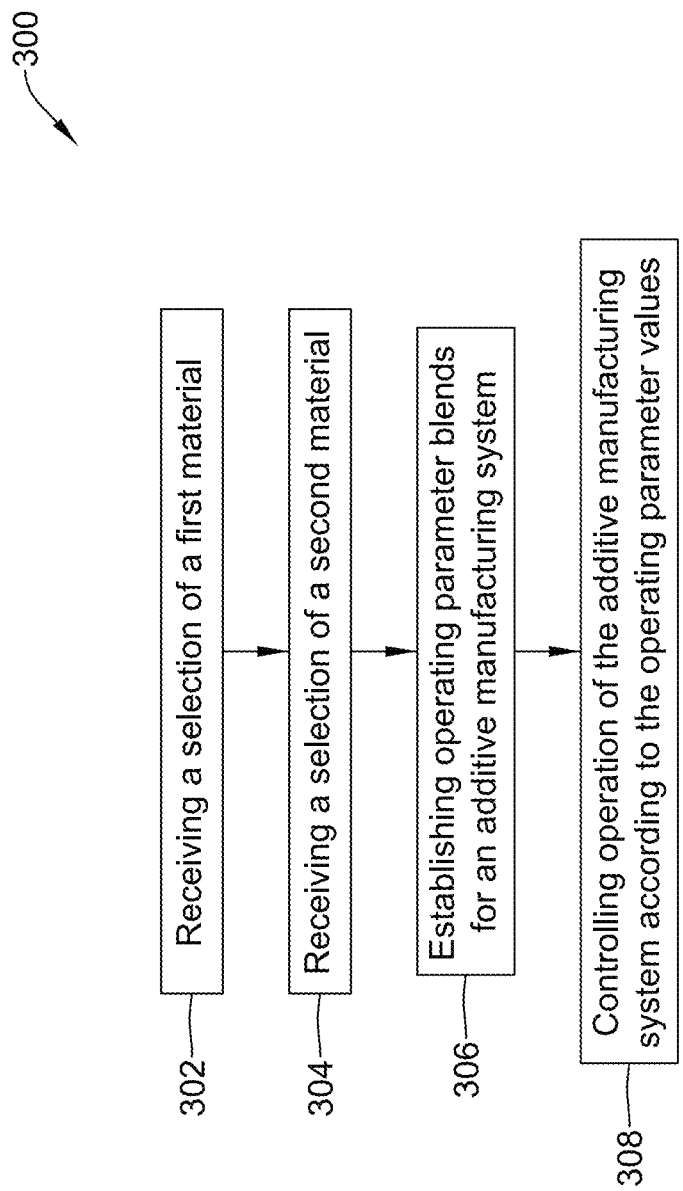
FIG. 6 is a schematic flow diagram of an illustrative method of controlling an additive manufacturing system to form multi-material components.

FIG. 6 depicts a schematic flow diagram of an illustrative method 300 for establishing values of operating parameters for an additive manufacturing system (e.g., the additive manufacturing system 40 and/or other suitable additive manufacturing system). The method 300 may include receiving and/or accepting 302 a selection of a first material and receiving or accepting 304 a selection of a second material. In some cases, a user interface of the additive manufacturing system may be configured to receive selections of materials for use in forming a multi-material component and a controller (e.g., the controller 42 and/or other suitable controller) may receive and/or accept those selections of the first and second materials. Although method 300 discloses two selections, it is contemplated that a selection of a set of materials including the first material and the second material may be a selection of a first material and a selection of a second material that are received and/or accepted by the controller. At the time of receiving the selection of the materials and/or in addition to receiving the selection of the materials, a selection of one or more objective parameters for the multi-material component may be received (e.g., at the controller and/or at a user interface of the additive manufacturing system).

In response to receiving the selections of the first and second materials, the controller may be configured to identify models (e.g., obtain models or develop models from historical data) of the first and second materials (e.g., models 54, 56 and/or other suitable models). The models may be stored at the controller, at one or more other suitable storage locations of the additive manufacturing system, at a remote server, and/or at one or more other computing devices.

Further, in response to receiving the selections of the materials, the controller may be configured to identify or otherwise obtain data (e.g., the data 60 and/or other suitable data) from sample multi-material components made with the selected materials. In some cases, this data may be obtained from a database in the controller, a database at any other suitable location in the additive manufacturing system, a database at a remote server, and/or a database at or of one or more other suitable computing devices. Alternatively or in addition, the controller may request a user to enter data from sample multi-material components made with the selected materials.

The method 300 may further include identifying or establishing 306 one or more operating parameter values for the additive manufacturing system based on the first material and the second material. In one example, the controller may be configured to identify or establish the one or more operating parameters based on the first material, the second material, and the one or more parameter objectives for a formed component, where the operating parameter values may be configured to produce a multi-material component having predetermined values of the one or more parameter objectives, in the manners discussed herein. In another example, the controller may be configured to identify or establish the one or more operating parameter values for the additive manufacturing system based on the model of the first material selected, the model of the second material selected, the one or more objective parameters and/or the data obtained from sample multi-material components made with the first and second materials, where the operating parameter values are configured to produce a multi-material component having predetermined values of the one or more parameter objectives, in the manners discussed herein. Once the operating parameter values have been determined, one or more control signals may be outputted from the controller to control 308 operation of the additive manufacturing system according to the operating parameter values.

Figure 7:
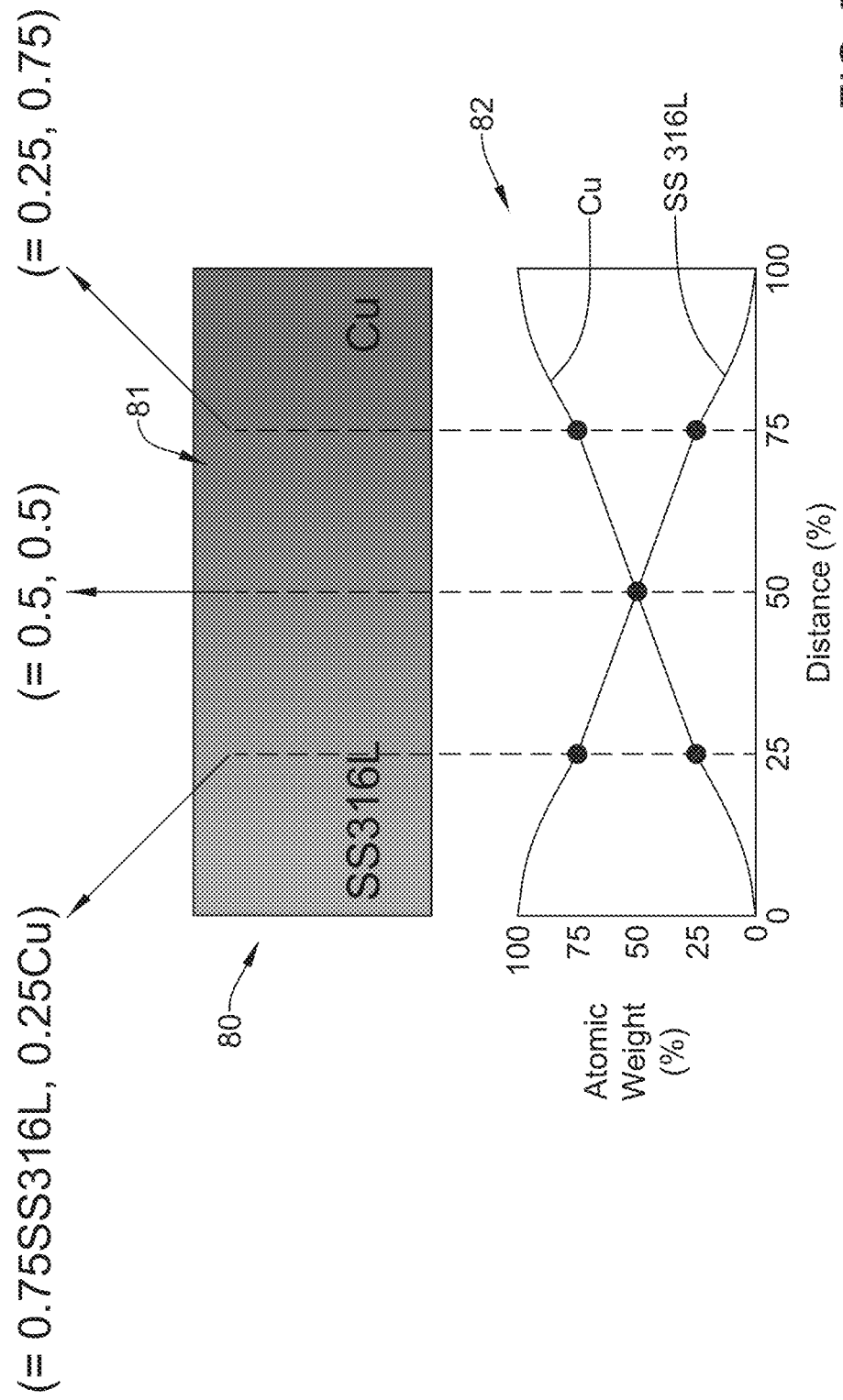
FIG. 7 is a schematic diagram of an illustrative multi-material component and associated graph.
Figure 9:
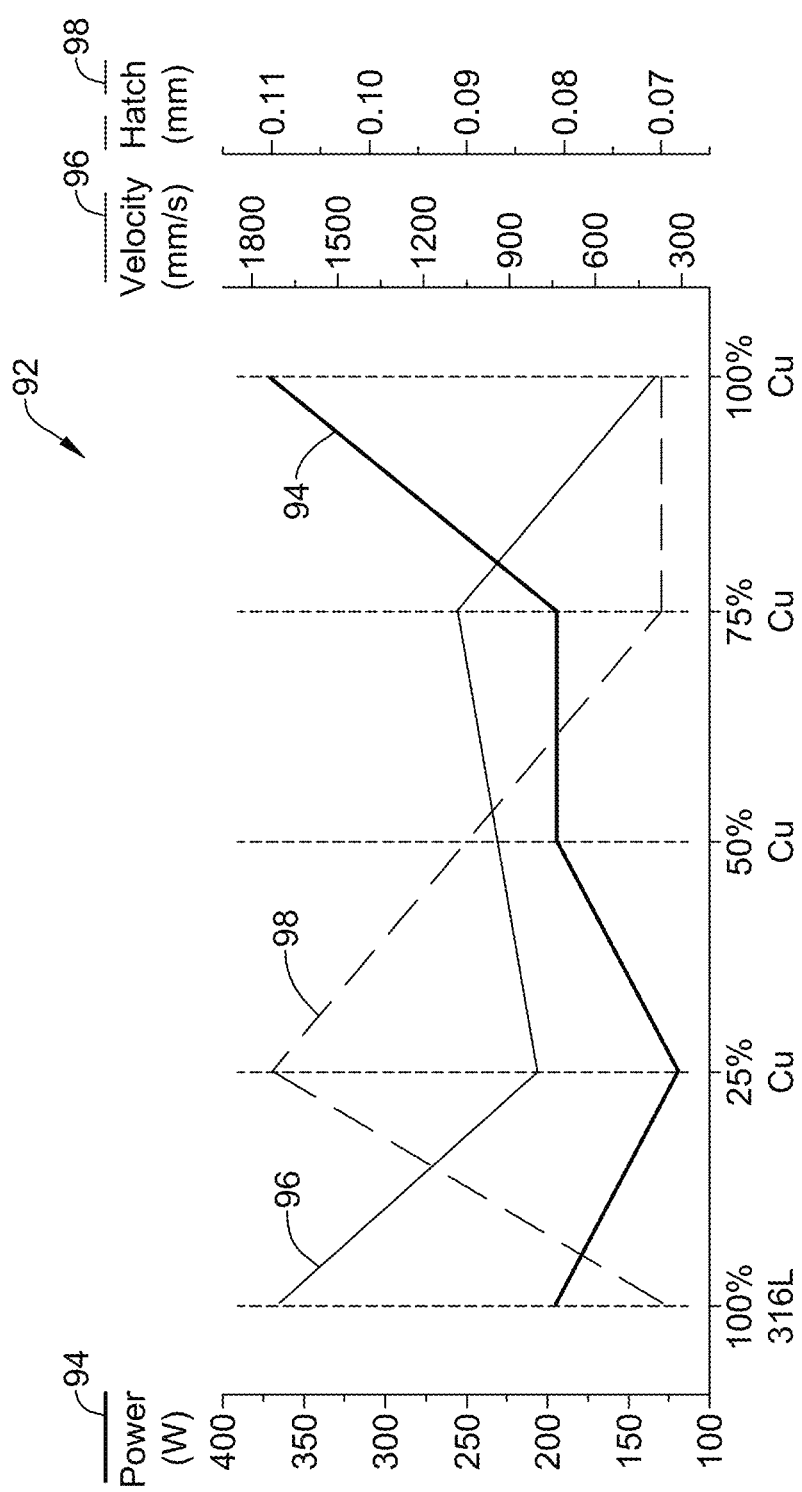
FIG. 9 is a schematic graph depicting the illustrative values for operating parameters presented in the chart of FIG. 8.

FIGS. 7-9 schematically illustrate an example utilizing the methods and techniques described herein to form a multi-material component from stainless steel 316L (SS316L) and copper (Cu) having been configured for a desired material density and a desired material roughness, in view of one another, using an SLM system. FIG. 7 schematically depicts a multi-material component 80 formed from stainless steel 316L and copper and having a gradient of stainless steel 316L and copper, which is shown schematically in graph 82. FIG. 8 depicts a chart 84 of predicted values 90 for operating parameters 86 of the SLM system by material composition 88 for forming the multi-material component 80. FIG. 9 depicts a graph 92 showing the predicted values 90 chart 84 in FIG. 8 with respect to one another as the composition of the multi-material component 80 in FIG. 7 changes along the gradient of stainless steel 316L and copper.

As depicted in FIG. 7, the multi-material component 80 may have a gradient 81 of stainless steel and copper. The graph 82 depicts a distance in percent of a total distance or length of the multi-material component 80 on an x-axis and an atomic weight by percentage on the y-axis. As is shown in the graph 82, the material composition of the multi-material component changes as a function of a location along the gradient 81 or as a function along a distance of the multi-material component 80. For example, at 25% of a distance of the multi-material component 80, the mixture composition by atomic weight may be 0.75% stainless steel 316L and 0.25% copper (e.g., where one or both of a percent of a distance of the multi-material component 80 and the mixture composition may be examples of a gradient mixture location), at 50% of a distance of the multi-material component 80, the mixture composition by atomic weight may be 0.50% stainless steel 316L and 0.50% copper, and at 75% of a distance of the multi-material component 80, the mixture composition by atomic weight may be 0.25% stainless steel 316L and 0.75% copper.

As depicted in FIG. 8, values for operating parameters of a laser (e.g., power (watts, W), velocity (millimeters per second, mm/sec), and hatch spacing (mm)) may be determined for gradient mixture locations along the gradient of stainless steel 316L and copper based on desired parameter objectives of density (kilograms per meter ($kg/m^3$), surface roughness Sa (micrometer (µm), and Surface roughness Wa (µm). The values for operating parameters of the laser when the multi-material component is 100% stainless steel 316L or 100% copper may be determined based on observed data and/or a model of the stainless steel 316L or on observed data and/or a model of the copper, respectively, and desired material density and desired surface roughness in view of one another (e.g., maximizing material density of the multi-material component and minimizing material roughness of the multi-material component in view of one another). The values for laser parameters to form the 100% stainless steel 316L portion of the multi-material component are 120 W, 800 mm/sec, and 0.11 mm to achieve material density of 7889 kg/mg, surface roughness Sa of 7.2 µm, and surface roughness Wa of 14.0 µm. The values for laser parameters to form the 100% cooper portion of the multi-material component are 370 W, 400 mm/sec, and 0.07 mm to achieve material density of 8706 kg/mg, surface roughness Sa of 7.9 µm, and surface roughness Wa of 10.4 µm.

The predicted values for the power, velocity, and hatch spacing of the laser may be based on the model of the stainless steel 316L, the model of the copper, and observed data from five sample multi-material components formed from stainless steel 316L and copper at each of the noted material compositions (e.g., gradient mixture locations) for desired values of material density, surface roughness Sa, and surface roughness Wa at each of the noted material compositions of the multi-material component formed using the predicted values of parameter objectives. As shown in the chart 84, the predicted values 90 for a material composition of 75% SS316L and 25% Cu are 120 W, 800 mm/sec, and 0.11 mm to achieve material density of 7783 kg/mg, surface roughness Sa of 6.9 µm, and surface roughness Wa of 8.2 µm. The predicted values 90 for a material composition of 50% SS316L and 50% Cu are 195 W, 940 mm/sec, and 0.09 mm to achieve material density of 8299 kg/mg, surface roughness Sa of 6.1 µm, and surface roughness Wa of 11.6 µm. The predicted values 90 for a material composition of 25% SS316L and 75% Cu are 195 W, 1083 mm/sec, and 0.07 mm to achieve material density of 7783 kg/mg, surface roughness Sa of 6.2 µm, and surface roughness Wa of 12.0 µm. A model for establishing operating parameters of an additive manufacturing system for forming multi-material components and developed in the manner discussed herein and based on the structure 70 depicted in FIG. 5 was used to determine the predicted values 90 for the operating parameters of the SLM system in the chart 84 of FIG. 8, but other suitable models are contemplated.

As can be seen from the chart 84 and the graph 92 in FIG. 9, if one were to interpolate values for operating parameters (e.g., power 94, velocity 96, and hatch spacing 98, in FIG. 9) at different gradient mixture locations along the gradient of the multi-material component 80 based on observed values of operating parameters at 100% stainless steel 316L and 100% copper, significant error would be introduced into the result multi-material component. That is, the values for the operating parameters do not appear to change linearly with changes in compositions along the gradient. As such, using the techniques disclosed herein to predict values of operating parameters at gradient mixture locations may facilitate forming multi-material components that have values of parameter objectives that are closer to desired, predetermined or optimized, values of parameter objectives than if interpolation is used to determine values of operating parameters of the SLM system.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A method of controlling an additive manufacturing system to form a multi-material component, the method comprising:
    identifying a model of a first material, the model of the first material is configured to output parameter values of the additive manufacturing system based on one or more parameter objectives for a component formed with the first material;
    identifying a model of a second material, the model of the second material is configured to output parameter values of the additive manufacturing system based on one or more parameter objectives for a component formed with the second material, the first material and the second material are different materials;
    identifying observed data from a plurality of samples having a gradient of the first material and the second material, wherein for each sample of the plurality of samples, the observed data includes a set of parameter values used by the additive manufacturing system to form the sample and an associated measured value for each of one or more parameter objectives for the multi-material component;
    establishing operating parameter values for the additive manufacturing system to form, at least in part, the multi-material component using the first material and the second material and having predetermined values of one or more parameters along a graded interface bonding the first material to the second material, the operating parameter values established are based on the model of the first material, the model of the second material, and the observed data, wherein the operating parameter values established change as a material composition of the first material and the second material changes along the graded interface; and
    outputting a control signal based on the operating parameter values established to cause the additive manufacturing system to form, at least in part, the multi-material component.

2. The method of claim 1, further comprising:
    identifying a model of multi-material components having the graded interface of the first material and the second material for determining operating parameter values of the additive manufacturing system based on the one or more parameter objectives for the multi-material component, the model of the multi-material components having the graded interface of the first material and the second material is based on the model of the first material, the model of the second material, and the observed data.

3. The method of claim 2, wherein the operating parameter values for the additive manufacturing system are output from the model of the multi-material components having the graded interface of the first material and the second material based on the predetermined values of each of the one or more parameter objectives for the multi-material component.

4. The method of claim 1, wherein the samples of the plurality of samples are formed using the additive manufacturing system.

5. The method of claim 1, wherein the operating parameter values of the additive manufacturing system include values of a laser hatch and one or both of a laser power or a laser velocity.

6. The method of claim 1, wherein the one or more parameter objectives for one or more of the component formed with the first material, the component formed with the second material, and the multi-material component include one or both of density and surface roughness.

7. The method of claim 1, wherein:
    the one or more parameter objectives for the component formed with the first material is one of:
        1) One or more parameter objectives for a component formed with only the first material or
        2) One or more parameter objectives for a multi-material component at a location of the multi-material component formed with only the first material; and
    the one or more parameter objectives for the component formed with the second material is one of:
        1) One or more parameter objectives for a component formed with only the second material or
        2) One or more parameter objectives for a multi-material component at a location of the multi-material component formed with only the second material.

8. The method of claim 1, wherein the observed data from the plurality of samples having a graded interface of the first material and the second material and are taken along the graded interface of the first material and the second material in the multi-material component at a same gradient mixture location of each sample of the plurality of samples.

9. The method of claim 8, wherein the predetermined values of each of the one or more parameter objectives for the multi-material component occur at a gradient mixture location of the multi-material component that is the same as the gradient mixture location at which observed data is taken from the plurality of samples.

10. The method of claim 1, wherein the plurality of samples includes five (5) or more samples having the graded interface of the first material and the second material.

11. A non-transitory computer readable medium having stored thereon in a non-transitory state a program code for use by a processor, the program code causing the processor to execute a method of operating an additive manufacturing system comprising:
receiving a selection of a first material, the first material having a first material composition;
receiving a selection of a second material, the second material having a second material composition;
developing an algorithm based on the first material, the second material, and observed data from a plurality of sample components formed using the first material and the second material, each sample component of the plurality of sample components having a gradient of the first material and the second material; and wherein the algorithm is configured to output the operating parameter values,
in response to receiving the selection of the first material and the second material, based on the algorithm, establishing operating parameter values for the additive manufacturing system based on the first material and the second material, wherein the operating parameter values for the additive manufacturing system are configured to form a component having predetermined values of one or more parameters along a graded interface bonding the first material to the second material, wherein the operating parameter values established change as material composition changes between the first material composition and the second material composition along the graded interface; and
outputting a control signal based on the operating parameter values for a location along the graded interface to cause the additive manufacturing system to form, at least in part, the component.

12. The non-transitory computer readable medium of claim 11, wherein the method further comprises:
receiving a selection of one or more objectives for parameters of the component; and
wherein the establishing operating parameter values for the additive manufacturing system is based on the first material, the second material, the one or more objectives for parameters of the component, and the location along the graded interface.

13. The non-transitory computer readable medium of claim 11, wherein each sample component of the plurality of sample components was formed using a set of operating parameter values of the additive manufacturing system that is different than sets of operating parameter values of the additive manufacturing system used to form the other sample components of the plurality of sample components.

14. A controller of an additive manufacturing system comprising:
a processor; and
memory configured to store in a non-transitory state instructions executable by the processor to cause the processor to:
accept a selection of a first material, the first material having a first material composition;
accept a selection of a second material, the second material having a second material composition;
in response to the selection of the first material and the second material,
accept observed data associated with a plurality of sample components formed using the first material and the second material and having a gradient of the first material and the second material; and
develop an algorithm configured to output the one or more operating parameter values based on the first material, the second material, and the observed data;
based on the algorithm, identify operating parameter values for the additive manufacturing system based on the first material and the second material and configured to form a component having predetermined values of one or more parameters along a graded interface bonding the first material to the second material, wherein the operating parameter values identified change as a material composition changes between the first material composition and the second material composition along the graded interface; and
controlling operation of the additive manufacturing system according to the one or more operating parameter values to form the component using the first material and the second material.

15. The controller of claim 14, wherein the one or more operating parameter values are identified based on predetermined values of one or more parameters at a gradient mixture location along the graded interface bonding the first material and the second material.

16. The controller of claim 14, wherein a model of the first material for determining parameter values of the additive manufacturing system based on one or more parameter objectives for parameters of the component and a model of the second material for determining parameter values of the additive manufacturing system based on the one or more parameter objectives are stored in a model database and used by the processor to determine the one or more operating parameter values in response to selection of the first material and the selection of the second material.

17. The controller of claim 14, wherein the operating parameter values identified change non-linearly along the graded interface as the material composition of the graded interface changes.

* * * * *